G. RUNQUIST.
ADDING AND LISTING MACHINE.
APPLICATION FILED JAN. 11, 1915.

1,213,268.

Patented Jan. 23, 1917.
8 SHEETS—SHEET 1.

Fig. 1.

WITNESSES:
E.H.Wagner
D.R.Partello

INVENTOR.
G. Runquist
BY
J.W.Cobb
ATTORNEY

G. RUNQUIST.
ADDING AND LISTING MACHINE.
APPLICATION FILED JAN. 11, 1915.

1,213,268.

Patented Jan. 23, 1917.
8 SHEETS—SHEET 2.

WITNESSES:
E.H.Wagner
A.R.Partello

INVENTOR.
G. Runquist
BY
ATTORNEY

G. RUNQUIST.
ADDING AND LISTING MACHINE.
APPLICATION FILED JAN. 11, 1915.

1,213,268.

Patented Jan. 23, 1917.
8 SHEETS—SHEET 3.

WITNESSES:
C. H. Wagner.
D. R. Partello

INVENTOR.
G. Runquist
BY
ATTORNEY

G. RUNQUIST.
ADDING AND LISTING MACHINE.
APPLICATION FILED JAN. 11, 1915.

1,213,268.

Patented Jan. 23, 1917.
8 SHEETS—SHEET 6.

WITNESSES:
C. H. Wagner
D. R. Partello

INVENTOR.
G. Runquist
BY
ATTORNEY

G. RUNQUIST.
ADDING AND LISTING MACHINE.
APPLICATION FILED JAN. 11, 1915.

1,213,268. Patented Jan. 23, 1917.
8 SHEETS—SHEET 7.

UNITED STATES PATENT OFFICE.

GUSTAF RUNQUIST, OF TERRE HAUTE, INDIANA, ASSIGNOR TO INTERNATIONAL MONEY MACHINE COMPANY, OF TERRE HAUTE, INDIANA.

ADDING AND LISTING MACHINE.

1,213,268.     Specification of Letters Patent.     Patented Jan. 23, 1917.

Application filed January 11, 1915. Serial No. 1,629.

*To all whom it may concern:*

Be it known that I, GUSTAF RUNQUIST, a subject of the King of Sweden, residing at Terre Haute, in the county of Vigo and State of Indiana, have invented certain new and useful Improvements in Adding and Listing Machines, of which the following is a specification.

This invention appertains to the art of adding and listing machines and involves among other things special improvements in the transfer or carry-over mechanism used in such machines. In respect to the transfer mechanism special effort has been directed in the working out of the present improvements toward rendering positive and certain the action of the carry-over racks or members whereby to insure a proper operation of the transfer mechanism.

Many machines now in use possess an objectionable feature in reference to the power required to operate the actuating handle of the machine, the latter being, of course, pulled, as customary in such machines, against the resisting tension of a spring or springs employed to normalize the adding and listing instrumentalities and the handle. In the present machine, by the interposition of unique connections and coöperating parts the power of certain springs which are utilized for actuating the adding racks and type carriers is availed of to assist in normalizing the handle and parts of the general mechanisms for which reason it is possible to employ main restoring springs of less power than heretofore, enabling the machine to be operated with the expense of correspondingly less power, whereby the performance of successive transactions on the machine is greatly facilitated.

In respect to the ribbon feed mechanism for the printing devices, improvement has been made by way of utilizing novel means for supporting the spools on and from which the inking ribbon is adapted to wind, the construction now permitting of the application of a stationary ribbon spool which can be purchased at any first class ribbon or adding machine supply house, to the spool support of the machine.

In addition to the foregoing a number of minor changes of construction in reference to the operating and controlling instrumentalities for the accumulating, transfer and controlling mechanisms have been devised, all with a view to the simplifying of the machine, facilitating the ease of operation of the various mechanisms, and, of great importance, rendering the action of the several mechanisms mechanically positive, certain and accurate as absolutely required in machines of this class.

In the drawings: —Figure 1 is a general front elevation showing the machine with the case on.

The adding machine hereinafter set forth embodies the usual casing A through sight openings at the front portion of which are visible the members on the adding wheels, a suitable keyboard embodying the amount keys B and suitable repeat, error, subtotal and total keys C, D, E and F respectively being employed. At the right side of the machine is mounted the customary operating handle G fixed to the main actuating shaft 625 and at the rear portion of the machine is the platen H along with mechanism for feeding the same rotatively for coöperation with the printing devices.

Figure 1:
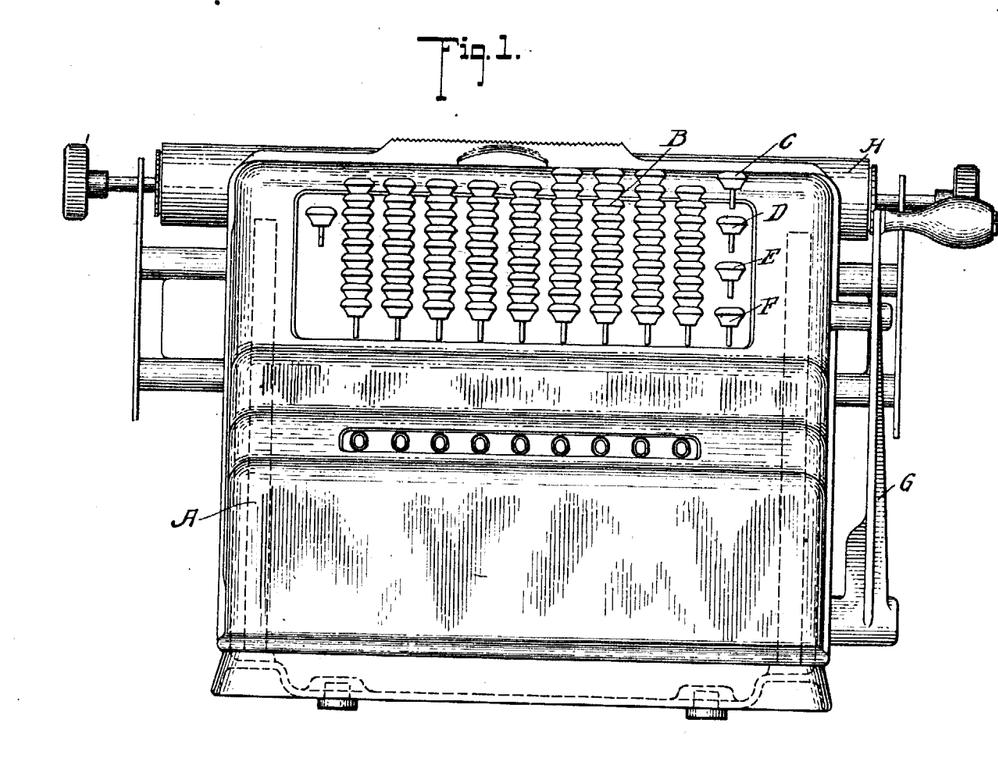
Figure 2:
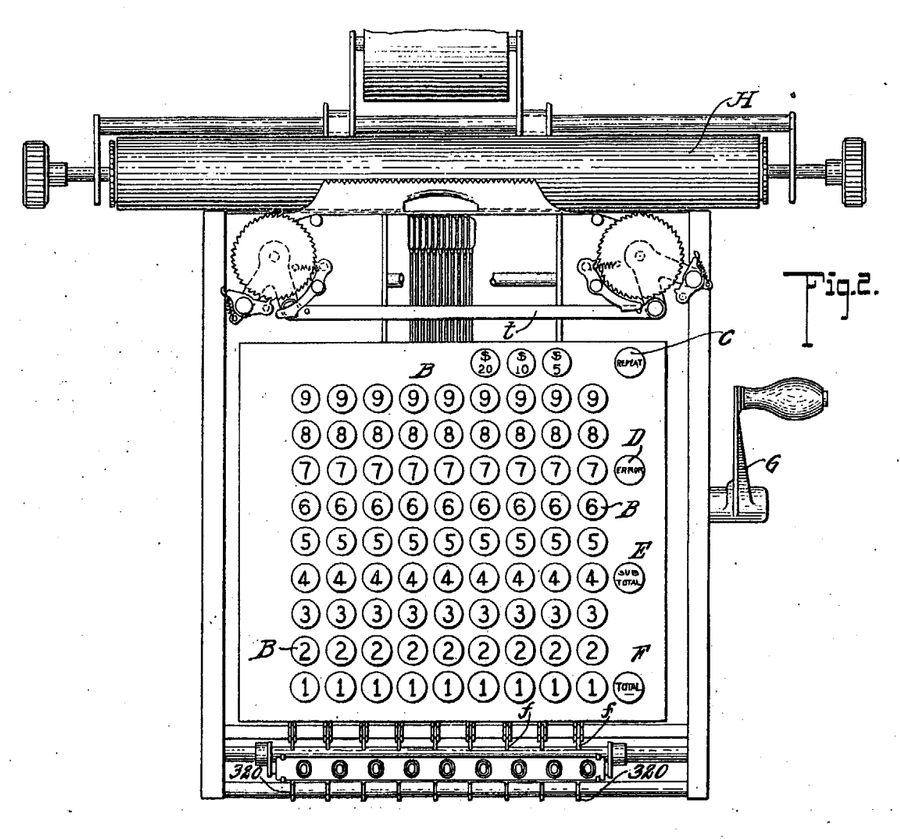
Fig. 2 is a general plan view with the case removed.
Figure 3:
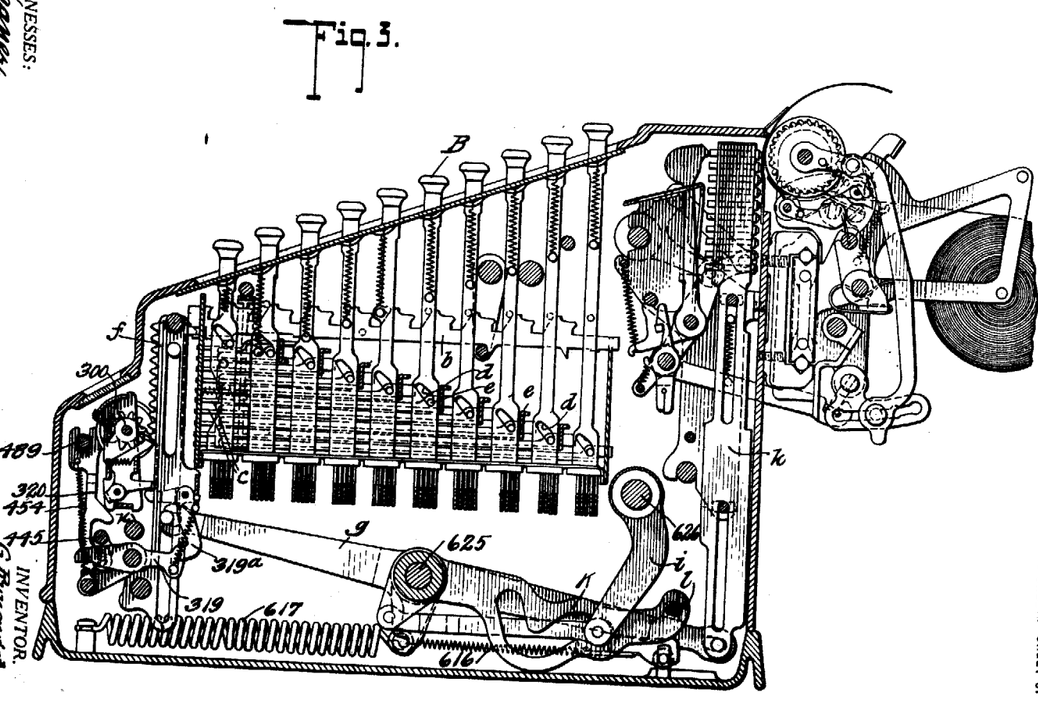
Fig. 3 is a sectionalized right side view, the section being taken on a line between the first and second banks of the keyboard.

It is not believed necessary to present with much detail the specific construction of the general mechanisms of the machine which are substantially the same as heretofore employed. However, on reference to Fig. 3 it will be seen that the amount keys B when depressed are adapted to shift rearwardly the locking bars $b$, said keys being locked depressed by suitable mechanism not shown in detail. Indexing slides $c$ are coöperative with the keys B by reason of suitable pin and slot connections $d$—$e$. On depressing a certain key B the locking bar $b$ locks all other keys in the same row from depression and simultaneously becomes disengaged from a coöperative adding rack $f$ located at its front end, thereby releasing the latter. Upon subsequent movement of the handle G the adding racks descend. Intermediately pivoted levers $g$ are loosely mounted on the main shaft 625 and engage at their front ends with the lower ends of the adding racks $f$ their rear ends being connected with the lower ends of the type carriers $h$. Motion is adapted to be transmitted from the main shaft 625 to the auxiliary shaft 626 through connections shown best in Figs. 11, 12 and 13 and comprising an arm 502 on the main shaft 625 flexibly connected by the link 509 and spring 618 with an arm 508, mounted on the shaft 626. As seen in Fig. 3 the shaft 626 carries the depending curved arms $i$ having rollers at their lower ends operating in crooked slots of the lever arms $k$ loosely mounted on the main shaft 625. A cross bar $l$ connects the outer ends of the arms $k$ and is adapted to engage over the rear ends of the levers $g$ whereby to hold the levers in the positions shown in Fig. 3, movement forward of the arms $i$ raising the lever arms $k$ and permitting the various levers $g$ to pivot about their axes under the influence of springs 616, shown clearly in Figs. 14 and 15 and to be described later more fully.

Figures 4, 5, 6, 7, 8, 9:
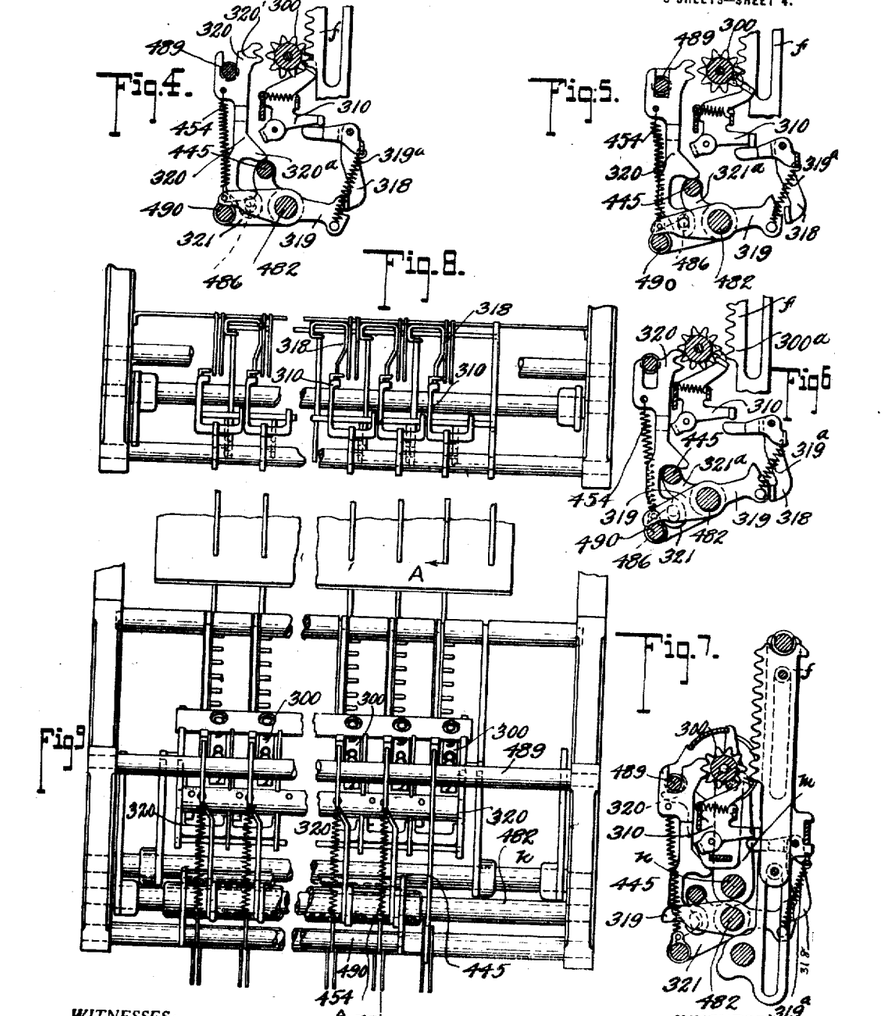
Fig. 4 is a sectional view of the accumulating mechanism, showing the carrying member being restored.
Fig. 5 is a view similar to Fig. 4 showing the transfer mechanism as when the adding wheels are passing from 9 to 0.
Fig. 6 is a sectional view of the same parts, the transfer being completed.
Fig. 7 is a more complete sectional view of the accumulating and transfer mechanism, with the parts in normal position and the dials registering zero.
Fig. 8 is a plan view of the transfer mechanism with some associated parts omitted for clearness.
Fig. 9 is a front elevation of the accumulating and transfer mechanism.

*Accumulating and transfer mechanisms.*— Figs. 3 to 9 inclusive show the accumulating and transfer mechanisms clearly, and referring thereto it will be noted that the accumulator comprises a frame supported by the vertical arms $m$ (see Fig. 7) on the rock shaft $n$. The rock shaft $n$ is capable of being rocked by any suitable mechanism whereby to shift the accumulator frame and the adding wheels mounted thereon rearwardly and forwardly. The adding wheels 300 supported in the accumulator frame are adapted to be engaged by forward movement with the carrying members 320, and to be engaged by rearward movement with the adding racks $f$. It suffices to say that in the adding, totaling and sub-totaling operations the coöperation of the adding wheels and adding racks is as customary in a certain class of machines. In other words, for purposes of adding or accumulating, the movement of the accumulator frame or section including the adding wheels is timed so as to engage the adding wheels with the racks $f$ when the racks are at the lower limit of their movement; for subtotaling operations the racks are engaged with the adding wheels and pinions both on the descending and ascending movement of the racks; and in the operation of taking a total the racks are engaged with the adding wheels at the outstart of the downward movement of the racks, and the machine is cleared in the totaling operation. Any conventional means may be employed to govern the coöperative action of the adding wheels 300 with the racks $f$ and the carrying members 320, the latter being toothed at 320′ to engage with the teeth of the wheels in an obvious manner. The means governing the action of the carrying members 320 forms an essentially novel feature of the present improvements and as seen in Figs. 4 to 7 inclusive there is located below the rock shaft $m$ a shaft 482 upon which are mounted a plurality of carrying levers 319. Each lever 319 has its rear end coöperative with a latch 318 of the transfer mechanism, its front end coöperative with a restoring member 490, and intermediate its axis and the point of its abutment with the restoring member 490 each lever 319 has a stud 486 projecting therefrom and entering a short vertical slot in the lower end of the carrying member 320. At its upper end the carrying member 320 is bifurcated to engage with a guide and stop bar 489 and intermediate its ends said member 320 is formed with a curved cam 320ª. On the shaft 482 are mounted space rock arms 321 extending forward and having secured thereto the restoring bar or member 490. The arms 321 furthermore have vertical extensions 321ª which support the auxiliary restoring member 445 coöperative with the cams 320ª. As seen in Fig. 9 and also Figs. 10 to 13 inclusive, a third arm 323 is fixed to the shaft 482 for rocking said shaft and thereby correspondingly rocking the members 490 and 445 supported by the arms 321. The arm 323 curves in a peculiar manner, shown in Figs. 11, 12 and 13 particularly, so that its upper end is adapted to engage the guide and stop bar 489 to limit movement of the arm in one direction.

Springs 454 tend to pull downward on the carrying members 320, being connected at their lower ends with the restoring member 490. Said springs, of course, correspondingly act upon the carrying levers 319 which when the parts are in the normal positions are held as shown in Fig. 7 by the latches 318. Pawls 310 coöperate with the latches 318 in such a manner that when the upper arm of a pawl 310 is tripped or depressed by a carry-over cam 300ª on one of the adding wheels, the lower arm of the pawl 310 will correspondingly depress the upper arm of the latch 318, thereby disengaging the foot of the latch 318 from the carrying lever 319, whereupon a spring 319ª connecting the parts 318 and 319, will cause the carrying lever to pivot on its axis thereby lowering its front end with the stud 486 and permitting the carrying member 320 to descend to effect transfer or carry-over action of the adding wheel of higher denomination, which wheel is at the particular time of descent engaged with the carrying member. In Fig. 4 the parts are disposed in the positions assumed in the action of restoring the carrying members 320 after one or more of them have been released to effect a transfer operation. The parts assume the positions of Fig. 4 and the corresponding positions of Fig. 13 when the handle G is at the end of its forward stroke. In Fig. 5 the adding wheel is shown in the act of passing from 9 to 0, tripping the pawl 310 and latch 318 to release the carrying lever 319 preliminary to the tilting of the latter incidental to the downward transfer movement of the member 320. Fig. 6 shows the transfer movement of the member 320 completed, and Fig. 7 shows the parts at normal, the rocking of the shaft 482 having lifted the restoring members 490 and 445 previously, thereby raising the parts 320 and 319 so that the latch 318 is engaged again with the carrying lever 319 and the latter is locked up along with the transfer or carrying member 320.

As well pointed out and really not needing specific mention perhaps, during the regular operation of the machine, every time the handle G is actuated the restoring members 490 and 445 are lowered. However, the carrying member 320 and the carrying lever 319 do not move downward each time the members 490 and 445 are actuated simply because the parts 319 and 320 are locked up by the latch 318 until a carry-over or transfer is required, the latter being controlled and effected by the special cam 300ª of the adding wheel of lower denomination. It was found heretofore in the operation of the carrying mechanism, that the movement of the carrying member was objectionably long since a slow action of the spring 454 would tend to cause a carry movement of the adding wheels at the wrong time. This objection has been remedied by moving the connection intermediate the parts 319 and 320 closer to the axis of the part 319, the degree of the movement of the part 319 not being altered. The member 445 is really an extra supporting member for holding the transfer or carrying member 320 in its normal position, after 319 is tripped off of latch 318, and until near the end of the stroke of the handle or when the projection 330' drops off the lower end of 529, see Fig. 11.

*Transfer control mechanism.*—In connection with the changes made in the carry-over instrumentalities as above noted, the control means governing particularly the action of restoring the carrying levers 319 and members 320 has been materially improved with a view to eliminating the need for control parts requiring exceedingly nice or close adjustment in order to operate properly. Furthermore the present improvements provide a positive means for accurately timing the movements of the transfer devices in connection with all of which reference is made to Figs. 10 to 13 inclusive of the drawings. These figures show the control parts which during every operation of the handle G compel movement of the arm 323 and the members 482, 490 and 445. Mention has been made before of the shaft 626 that is operated from the main shaft 625. Projecting upwardly from the shaft 626 and adapted to rock at each actuation of said shaft is an arm 528 carrying the spring stud 697 and formed with a stop member 529. Pivoted at a point above the arm 528 is the control lever 330 formed with the slot 330'' and having spaced projections 330ª with which the springs 442 and 443 are connected. Said springs 442 and 443 are correspondingly attached at adjacent ends to slotted plates 332 the latter receiving in the slots thereof the studs 697 of the arm 528. The slot 330'' of the lever 330 receives a roller 690 carried by the arm 528, said roller being adapted to engage with the lower wall of the slot which forms a track therefor, so to speak. The stop member 529 is provided with an outwardly projecting elongated cam 529' coöperative with a projection 330' and roller 438 carried by the lower end of the lever 330 and spaced from one another. The springs 442 and 443 are really used to operate the transfer control mechanism and by using the same a close adjustment of parts is avoided and furthermore the peculiar support for the spring provides for gradually storing up the power for operating the control mechanism during the whole stroke of the machine. The power to complete the stroke is thereby reduced and the action of the transfer control mechanism is rendered positive.

Describing the operation of the transfer controlling means, it will be apparent that the auxiliary or governor shaft 626 is rocked in a rearward direction by the forward movement of the handle G thereby stretching the spring 443 attached to the lever 330.

Figure 13:
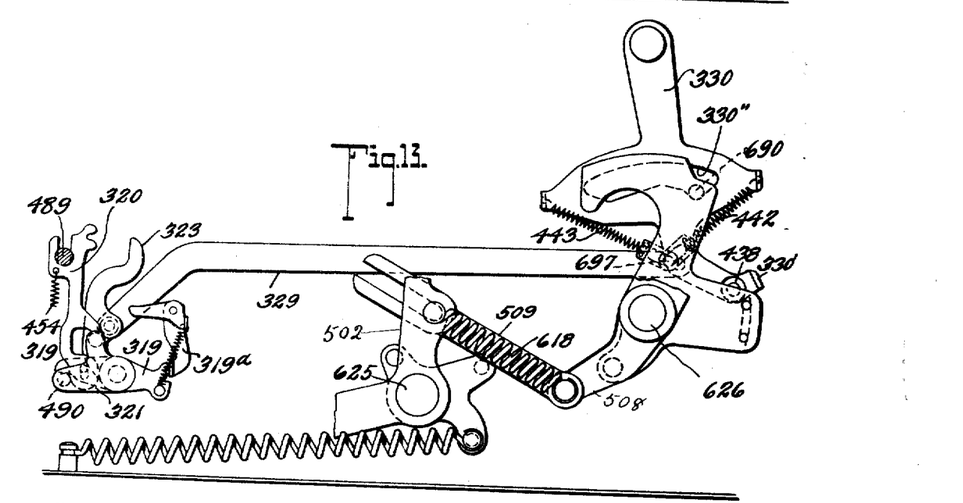
Fig. 13 is still another view of the same mechanism when the transfer members are in the position shown in Fig. 4 and the operating handle in extreme forward position.

The lever 330 cannot follow the arm 528 rearwardly because the projection 330' promptly engages the outer face of the cam 529' and remains in such engagement until it passes beyond the lower extremity of said cam. When the projection 330' escapes the upper extremity of the cam 529' the lever 330 will be quickly pulled rearward by the action of the spring 443 now stretched to its maximum and thereupon a link 329 connecting the lower portion of the lever 330 with the arm 323 on the shaft 482, is actuated to rock the arm 323 rearward, thereby rocking the shaft 482 and raising the members 490 and 445. The upward movement of the parts 490 and 445 is limited by the engagement of the lower extremity of the bifurcation of the carrying member 320 with the guide and stop bar 489. The rocking of the parts 490 and 445 will restore the transfer mechanism including the parts 319 and 320 if these members have previously been released and thereby permitted to cause a transfer action of the adding wheels. The relative positions of the parts at the completion of a restoration of the transfer devices 319 and 320 are illustrated in Figs. 4 and 13 of the drawings, the handle being at its forward limit of movement, not shown.

Figure 12:
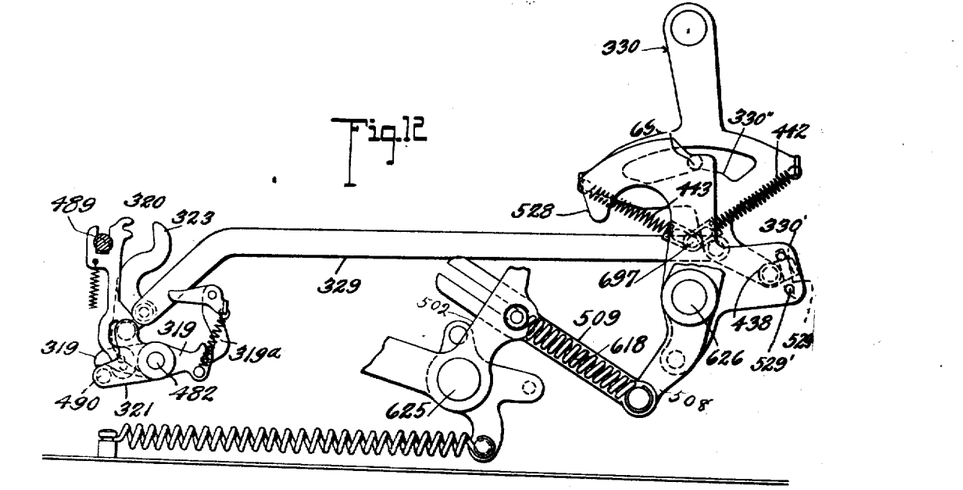
Fig. 12 is another view of the same mechanism when the transfer members are in position, shown in Fig. 5.

On the return stroke of the handle G it is desired to maintain the transfer control mechanism in the position shown in Fig. 12 while the machine goes through the operation of adding. To accomplish this the roller 690 of the arm 528 acts on the lower portion of the slot 330" forcing the lever 330 over to the position shown in Fig. 12 where it is held owing to the movement of the cam 529' through the space between the roller 438 and the projection 330'. The lever 330 is held in this particular position until the cam 529' passes upward beyond the part 330' and while the lever 330 is held relatively stationary in this manner the spring 442 will be expanded as the stud 697 moves forward with the member 528 now returning to its normal position. The release of the lever 330 as the parts 330' and 529' become disengaged on the upward movement of the latter permits the lever to be drawn forward under the action of the spring 442, thereby restoring the arm 323 and lowering the parts 490 and 445 which permit the proper carrying action of the parts 319 and 320 during the final movement of the handle resuming its rearward normal position. In other words, the parts 323, 490 and 445 have their movement by which the transfer action will be permitted if the parts are ready to carry over delayed until the accumulator is practically at its normal position with the adding wheels having their pinions engaged with the carrying members 320. The forward movement of the lever 330, link 329 and movement of connected parts is limited by the engagement of the arm 323 with the guide and stop bar 489, as previously suggested.

Figures 10, 11:
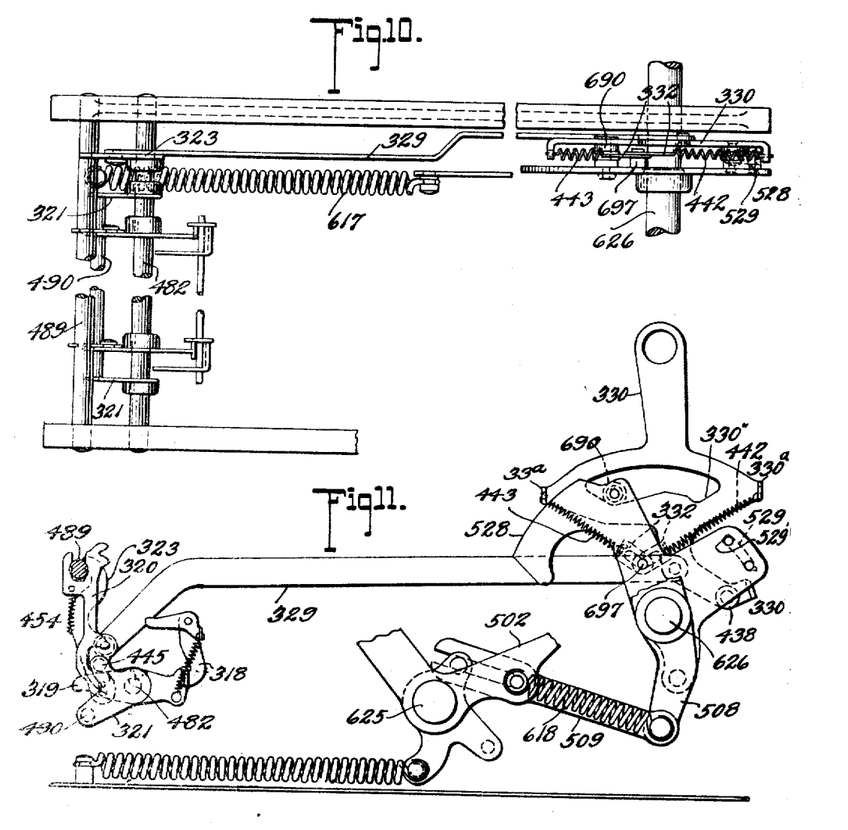
Fig. 10 is a plan view of the transfer control mechanism in normal position.
Fig. 11 is a right elevation of the transfer control mechanism in normal position.

As will be apparent from Fig. 11, the lower portion of the slot 330" of the lever 330 is formed so that it is too abrupt to permit the lever 330 being operated by the roller 690 without the aid of the spring 443. The formation is such, however, that it serves the purpose of holding up the machine in case the spring should fail to act. The machine cannot return, therefore, without completely restoring the transfer mechanism. The provision of the slotted plates 332 to connect the springs 442 and 443 with the stud 697 permits either of the springs to be stretched while the other remains neutral. In case the action of the spring 443 is sluggish or weak, the roller 690 will strike the face 330" and help to make positive the movement of lever 330.

Figure 14:
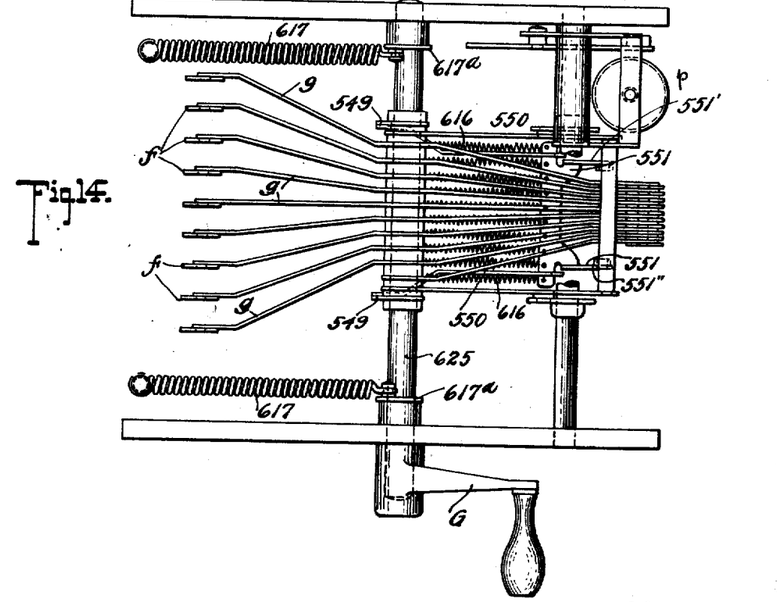
Fig. 14 is a plan view showing the converging levers with the cradle or carrier for the springs which operate them.
Figure 15:
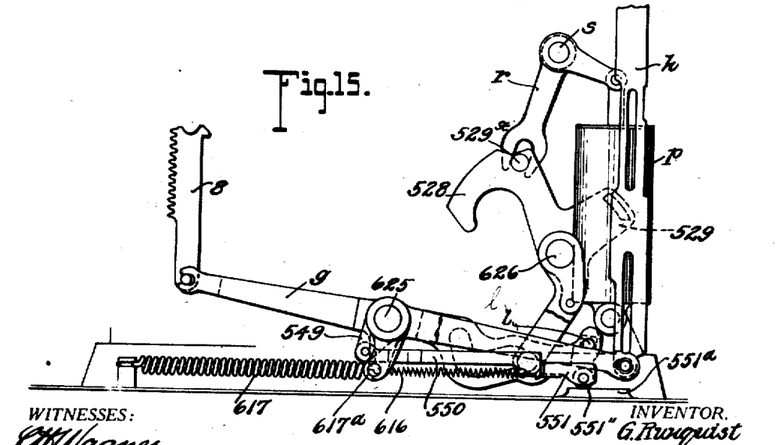
Fig. 15 is a right elevation of the same mechanism.
Figure 16:
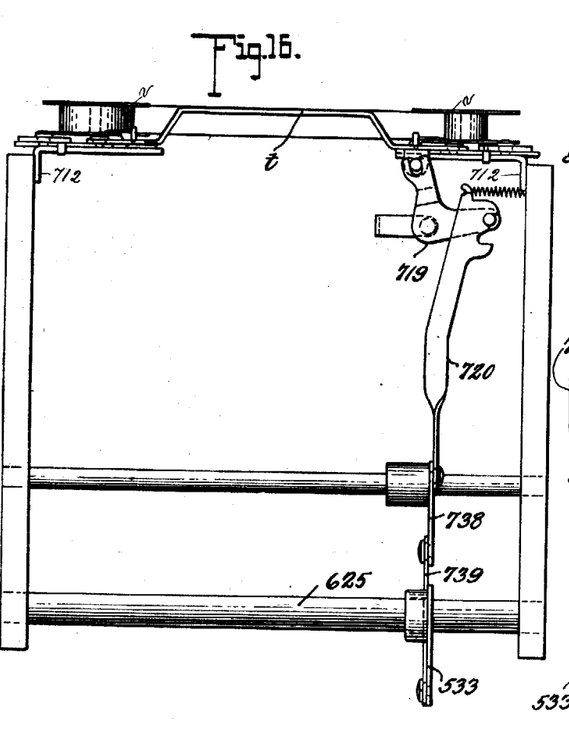
Figs. 16 and 17 are front and right side views respectively of the ribbon carrying and feeding mechanism.
Figures 17, 18, 19:
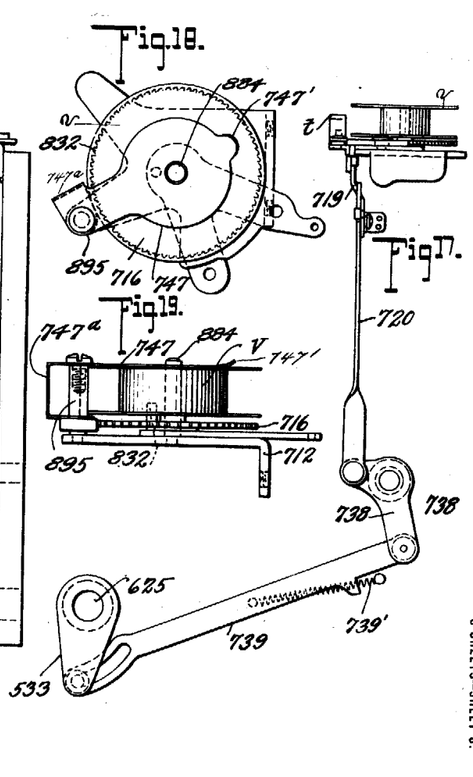
Figs. 18 and 19 show the improved means of holding the spools.

*The adding rack and type bar actuating means and normalizing devices for several mechanisms.*—The means for operating the adding racks at one end of the operating members or levers g, and the type carriers h at the other end coöperates in such a peculiar way with the spring devices for normalizing the various mechanisms that these parts will be described together by reference to Figs. 14 and 15 of the drawings. Projecting downward and from and fixed to the main shaft 625 are the two spaced arms 549 each of which is connected with a link 550 extending toward the rear end of the machine. The two links 550 are attached in any suitable way to a spring carrier 551 which consists essentially of a flat plate or body having a number of holes therein for the attachment of the adjacent ends of the various springs 616 which are connected at their other ends with central arms formed on the levers g. The carrier 551 has rearwardly extending arms 551' supporting rollers 551", the latter being adapted to travel on the slightly elevated base portion 551ᵃ of the base of the machine. It is to be understood that as the handle G is pulled forward the arms 549 of shaft 625 rock rearwardly and move the links 550 in the same direction. By this means the carrier 551 is forced rearward also and the springs 616 already placed under considerable tension for the purpose of pulling downward on the front ends of the levers g and forcing the rear ends of the type carriers h upward, have their tension maintained. This is due to the fact that notwithstanding that the springs 616 will properly rock the levers g, as soon as the detent bar l is raised by the movement of the handle, the extent of expansion, and consequently of power of the springs 616 incidental to their distention, remains practically constant even after the arms 549 move rearward their maximum distance of movement, the point of connection and support of the rear ends of the springs moving an extent corresponding with the movement of said arms 549.

The mounting and action of the springs 616 is utilized in a peculiar way in coöperation with the main normalizing springs 617 which are suitably attached at their front ends to the base of the machine and secured at their rear ends to arms 617ª fixed to the main shaft 625. The springs 617 must needs be sufficiently powerful to carry the handle G rearward, move the detent bar $l$ downward to restore the adding racks $f$ and the type carriers $h$ to normal and likewise normalize associated parts of the machine, movement of which is effected or controlled by the power applied to the handle G when it is pulled forward. The speed of the machine incidental to the operation of the handle is governed by the dash-pot $p$, see Figs. 14 and 15, the plunger of the dash-pot being connected with the shaft 625 indirectly through the provision of a stud 529ˣ on the arm 528, said stud engaging an arm $r$ on the shaft $s$, the latter being operatively connected with the plunger rod of said plunger in any conventional manner. The dash-pot arrangement and operation forms no part of the present invention.

Heretofore it has been found necessary to employ springs similar to the springs 617 above referred to, of considerable power in order to normalize the parts of the machine after a transaction, having in view the considerable load on the operating handle. This load is materially decreased in the machine having the present improvements owing to the fact that the tension of the several springs 616 coacting with the converging levers $g$ is employed for returning the mechanisms of the machine to normal positions. Having in view the coöperation of the springs 616, springs 617 of much less strength than those heretofore employed may be used for effecting normalization of the machine. Consequently the power required to pull the handle G forward is less than heretofore necessary, rendering the whole machine susceptible of more speedy operation incidental to the back and forth movement of the handle G or the operation of the main shaft 625 by any suitable means such as a motor, often employed for such purpose.

Describing the coaction of the springs 616 and 617, it may be noted that as the handle G is drawn forward against the resistance offered by the main springs 617, the arms $i$ are moved forward in such a way as to raise the levers $k$ and the detent bar $l$. At a predetermined part of the movement of the handle, the releasing of the levers $g$ from depression at their rear ends by the bar $l$ throws the springs 616, already under tension, into action, said springs pulling on the arms 549 fixed to the shaft 625 and thereby assisting in the forward movement of the shaft acting in opposition to the springs 617. Were the rear ends of the springs 616 secured to a stationary support the power of these springs would be decreased as the arms 549 move rearward, for obvious reasons, and furthermore a reduction in the tension of the springs at such time is disadvantageous because the levers $g$ must necessarily become less responsive to the action of the springs, correspondingly affecting the operation of the adding racks $f$ and the type carriers $h$. Thus it is that during the forward movement of the handle the spring carrier 551 is moved rearward and energy is stored up in the springs 616, which latter assists in the normalizing of the machine rendering more certain and positive the operation of the accumulating and printing mechanisms at the expense of a less amount of power or force applied to the main shaft 625.

*Printing ribbon mechanisms.*—Figs. 16 to 19 inclusive show the improvements made in the inking ribbon mechanism of the printing section of the machine. The main shaft 625 has an arm 533 connected by a pin and slot connection with a link 739. A spring 739' is connected with the link and said link is likewise secured to a bell crank lever 738. Movement is transmitted from the lever 738 to a drag bar $t$ through the provision of the link 720 secured to the lever 738 at one end and having adjustable or shifting connection with an arm of a bell crank lever 719 which is suitably engaged with the bar $t$ to restrict the latter as an incident to the movement of the handle shaft 625. The drag bar $t$ has suitable connections, not shown in detail, whereby ratchet wheels 716 mounted on brackets 712 may be rotated. One of the objects of the improvements in this portion of the mechanism of the machine is to devise a simple means for the attachment or mounting of a ribbon spool and ribbon such as ordinarily purchasable at ribbon supply houses, upon the ratchet wheel or wheels 716 of which there are two. With this in view the ratchet wheel 716 is provided with a spindle 884 for the spool $v$ and also with a stud 832 to engage in a recess formed in the spool to transmit the movement of the ratchet wheel to said spool. A spool retainer 747 is carried by a post 895 and said retainer comprises a U-shaped supporting part 747ª through the sides of which the post 895 passes and with one of the sides of which the spring member constituting the body of the retainer is formed. In other words, extending from the part 747ª is a spring member adapted to overlap the spool $v$ and having an opening through which the spindle of axis 884 is adapted to pass. The free end of the spring member of the retainer is formed with a thumb piece 747' slightly curved upward whereby the spring member may be grasped and lifted a sufficient distance to clear the spindle 884, whereupon the retainer may be swung bodily on the post 895 as an axis and the spool be replaced or removed as desired. The spring member of the retainer 747 bears against the top of the spool v with sufficient friction to avoid liability of spinning of the spool under the actuation of the ribbon feed drive mechanism.

It will be understood that the levers g constitute operating members for the accumulating and printing mechanisms of the machine, that the springs 616 form an operating means for said members when the same are restored by the downward movement of the detent bar l, and that the restoring device or spring 617 is assisted in performing its restoring or normalizing function owing to the fact that at a certain period in the operation of the main actuator and as an incident to said operation, the operating means 616 are caused to coact with the main actuator in such a way as to act auxiliary to the part 617 in performing its restoring function. During the initial forward movement of the handle G the detent bar l remains stationary while the spring carrier 551 moves rearward expanding the springs 616 to increase the power of the latter to cause speedy action of the parts g as soon as they are released at a subsequent operation of the forward stroke of the handle.

Having thus described the invention, what is claimed is:—

1. In a machine of the class described, an accumulator comprising transfer mechanism including a carrying member, and controlling means connected with said member comprising a control member, a spring attached thereto, an operating device for the spring to store up energy therein for actuating the control member, a main actuator coacting with said device to subject the carrying member to the action of the spring, and means on the operating device to preliminarily restrain the control member as the spring is energized and for subsequently releasing the control member.

2. In a machine of the class described, an accumulator comprising transfer mechanism including a carrying member, and controlling means for said member comprising springs, means to operate said springs to store up energy therein to act in opposite directions, a main actuator, and means intermediate the carrying member and said springs operable in opposite directions by the latter to control the action of the carrying member.

3. In a machine of the class described, a carrying member, a lever connected thereto, energy storing means connected with the lever to move the same in opposite directions, a main actuator, means for subjecting the lever to the action of the energy storing device at a predetermined time in the action of the main actuator, and means for restraining and releasing the lever incident to the action of said energy storing device thereon in either of opposite directions 4. In a machine of the class described, the combination of a carrying member, a controlling lever therefor, a connection between said lever and the carrying member, an energy storing device connected with the lever, a main actuator, means operable by the main actuator for storing up energy in said energy storing device whereby to actuate the lever, and means intermediate the last mentioned means and the lever for direct operation of the same.

5. In a machine of the class described, a carrying member, a lever connected thereto, an energy storing device connected with the lever, a main actuator, means for subjecting the lever to the action of the energy storing device at a predetermined time in the action of the main actuator, an operating member connected with the energy storing device for storing up energy in the latter, and locking and releasing means for said lever carried by said operating member and controlling the time of movement of the same under the action of the energy storing device.

6. In a machine of the class described, a carrying member, a lever connected thereto, an energy storing device connected with the lever, a main actuator, means for subjecting the lever to the action of the energy storing device at a predetermined time in the action of the main actuator, an arm operable from the main actuator to store up energy in the energy storing device, and locking and releasing means for said lever operable by said arm.

7. In a machine of the class described, the combination of a carrying member, a controlling lever therefor, a connection between said lever and the carrying member, an energy storing device connected with the lever and adapted to move the same in opposite directions, a main actuator, means operable by the main actuator for storing up energy in said energy storing device whereby to actuate the lever, and means intermediate the last mentioned means and the lever for direct operation of the same.

8. In a machine of the class described, the combination of a carrying member, a controlling lever therefor, a main actuating member, an arm operable from said actuating member, spring devices connecting the arm with the lever and separably operable by the arm to store up energy whereby to operate the lever at a predetermined time, and means on the arm coacting with the lever for delaying movement of the lever under the action of the said spring devices.

9. In a machine of the class described, the combination of a carrying member, a controlling lever therefor, a main actuating member, an arm operable from said actuating member, separate spring devices connecting the arm with the lever and operable by the arm to store up energy whereby to operate the lever at different times, means on the arm for engaging and delaying movement of the lever under the action of the said spring devices, and an operative connection between the arm and the lever controlling the coöperation of the movement delaying means with the lever.

10. In a machine of the class described, the combination of a carrying member, a controlling lever therefor, a main actuating member, an arm operable by the latter, springs connected with the arm and with the lever and each adapted to have energy stored up therein when the arm is moved in one of two directions, and means intermediate the arm and the lever to hold the lever stationary during movement of the arm by which energy is stored up in either of said springs.

11. In a machine of the class described, the combination of a carrying member, a controlling member therefor, an actuating arm, an energy storing device connected with the lever and with the arm and operable by the arm to have energy stored up therein, and means actuated by the arm for preventing movement of the controlling member while said arm is operating to store up energy in the energy storing device.

12. In a machine of the class described, the combination of a carrying member, a controlling member, an actuating arm, an energy storing device connected with the lever and with the arm and operable by the arm to have energy stored up therein, means controlled by the arm for preventing movement of the controlling member while said arm is operating to store up energy in the energy storing device, and a direct connection between said arm and the controlling member including a cam element for shifting the controlling member to govern the coöperation therewith of the movement preventing means.

13. In combination, a carrying member, a controlling lever, a link connecting the said parts, an actuating arm, springs connected with said arm and with the lever and each operable by the arm to have energy stored up therein whereby to effect movement of the lever, and different movements delaying connection between the arm and the lever to prevent the movement of the lever until the arm reaches predetermined points in its movement, whereupon the lever will be subjected to the action of an operative one of the springs.

14. In combination, a carrying member, a controlling lever, a link connecting the said parts, an actuating arm, springs connected with said arm and with the lever and each operable by the arm to have energy stored up therein whereby to effect movement of the lever, said arm being provided with an extension, a projection on the lever, and a cam carried by the extension aforesaid and coöperative with the projection to delay the movement of the lever in opposite directions until the arm has reached certain periods of its own movement.

15. In an adding machine, the combination of an accumulator comprising adding wheels and carrying members coöperative therewith, means to effect carrying movement of the carrying members, rocking means to prevent carrying movement of the carrying members until the accumulator is set for transfer operation, and restoring means for the carrying members including a rock shaft, arms projecting from said shaft, a restoring member carried by said arms and coöperative with the carrying members, a stop and guide bar coöperative with the carrying members and limiting the movement of the restoring means in one direction, and means on said rock shaft coöperative with said bar to limit the movement of the restoring means in an opposite direction.

16. In an adding machine, the combination of an accumulator comprising adding wheels and carrying members coöperative therewith, means to effect carrying movement of the carrying members, rocking means to prevent carrying movement of the carrying members until the accumulator is set for transfer operation, and restoring means for the carrying members including a rock shaft, arms projecting from said shaft, a restoring member carried by said arms and coöperative with the carrying members, a stop and guide bar coöperative with the carrying members and limiting the movement of the restoring means in one direction, an arm projecting from said rock shaft and coöperative with the stop and guide bar to limit the movement of the restoring means in the other direction, and actuating means for said arm controlling the operation of the said restoring means.

17. In an adding machine, the combination of an accumulator comprising adding wheels and carrying members coöperative therewith, means to effect carrying movement of the carrying members, rocking means to prevent carrying movement of the carrying members until the accumulator is set for transfer operation, and restoring means for the carrying members including a rock shaft, arms projecting from said shaft, a restoring member carried by said arms and coöperative with the carrying members, a stop and guide bar coöperative with the carrying members and limiting the movement of the restoring means in one direction, and means on said rock shaft coöperative with said bar to limit the movement of the restoring means in an opposite direction, said preventing means including carrying levers connected with the carrying members aforesaid and engageable by the restoring member in the coöperation of the latter with the carrying members.

18. In an adding machine, an accumulator comprising adding wheels, carrying members associated therewith, transfer mechanism including carrying levers, connections between the carrying levers and the carrying members, means to lock and release the carrying levers to control the carrying operations of the carrying members, restoring means for the carrying members comprising an oscillatory restoring member coöperative with the carrying levers only after release of the latter whereby to effect restoration of said levers to locking positions and normalizing of the carrying members, supporting parts for said restoring member to oscillate the same and including an auxiliary member engageable with the carrying members to return the latter to their normal positions after the completion of a transfer action.

19. Controlling and operating mechanism for adding machines, and the like, comprising in combination, operating members, a main actuator controlling said operating members, a restoring device for said main actuator, and operating means for said operating members operable as an incident to the action of the main actuator to act auxiliary to the restoring device.

20. Operating mechanism for adding machines and the like, including operating members, a main actuator controlling said operating members, a restoring spring for the main actuator, operating springs for the operating members, and means intermediate the main actuator and the operating springs for causing coöperation of the latter with said restoring springs as an incident to the operation of the main actuator.

21. Operating mechanism for adding machines and the like, including in combination a plurality of operating levers, operating springs connected with said levers, a main actuator controlling said levers, restoring means for the latter, and means connected with the main actuator to act on the operating springs aforesaid so as to cause coöperation of said springs with the restoring device.

22. Operating mechanism for adding machines and the like comprising a plurality of operating members, means for normally holding said members against movement, operating means for said members, a main actuator, a connection between said main actuator and said operating means for adjusting the latter during initial movement of the main actuator, and a restoring device for the main actuator coöperating with the said operating means when the latter has been adjusted in the manner above described, to normalize the main actuator and associated parts.

23. Operating mechanism for adding machines and the like comprising a plurality of operating members, operating springs connected therewith, a spring carrier connected to said springs, a main actuator, a restoring device for the said actuator and the carrier, and a connection between the main actuator for adjusting the latter and correspondingly adjusting the operating springs, to act auxiliary to the restoring device as an incident to the operation of the main actuator.

24. Operating mechanism for adding machines and the like including, in combination, a plurality of operating members, a main actuating shaft, oscillating means for said operating members operable from said shaft, a restoring spring connected with the shaft, operating springs connected with the operating members, a spring carrier connected to the operating springs, and a connection intermediate said shaft and the spring carrier whereby to cause the operating springs to act auxiliary to the restoring device as an incident to the operation of the main actuator.

25. Operating mechanism for adding machines and the like including a plurality of operating levers, a detent bar for holding said levers in a predetermined position, a main actuator comprising a shaft, a restoring device, arms fixed to the shaft, a spring carrier, springs connected with said carrier and with the operating levers, links connecting said arms with the spring carrier whereby on movement of the shaft the tension of the springs is increased, and means to operate the detent bar to release the operating levers and permit said springs to coact with the restoring device to act auxiliary thereto in the restoring operation.

26. In a machine of the class described, the combination of an accumulator and its operating means, means for establishing and discontinuing coöperation of the accumulator and said actuating means comprising a main actuator, restoring means for the actuator and coacting parts, and means to effect coöperation of said operating means with the main actuator incident to operation of the latter, whereby to assist the restoring means in performing its function.

27. Controlling and operating mechanism for adding machines, and the like, the same comprising operating members, operating means for said members, a main actuator, a restoring device for the main actuator, and means to effect coöperation of the said operating means with the restoring device as an incident to the operation of the main actuator whereby the operating means assists the restoring device to perform its function.

28. In a machine of the class described, the combination of a main actuator, operating members adapted to position adding racks or type carriers, means intermediate the main actuator and said operating members for holding the latter in predetermined position, springs connected with the operating members for actuating the same when they are released by movement of the main actuator, and means for increasing the tension of said springs incident to the movement of the main actuator.

29. In a machine of the class described, the combination of a main actuator, operating members adapted to position adding racks or type carriers, means intermediate the main actuator and said operating members for holding the latter in predetermined position, springs connected with the operating members for actuating the same when they are released by movement of the main actuator, a spring carrier connected with the several springs coöperative with the operating members, and means intermediate said carrier and the main actuator for moving the carrier incident to operation of the actuator in such a manner as to increase the tension of said springs.

30. In a machine of the class described, a carrying member, a lever connected thereto, an energy storing device connected with the lever, a main actuator, means for subjecting the lever to the action of the energy storing device at a predetermined time in the action of the main actuator, an arm operable from the main actuator to store up energy in the energy storing device, and locking means for said lever operable by said arm.

31. In combination, carry-over control mechanism including a control lever, normally inactive energy storing devices coöperating with said lever to effect different movements of the same, means for rendering one or the other of said energy storing devices operative, and means to delay the action of said devices in connection with the control lever until a predetermined time after said devices are rendered operative.

32. In transfer control mechanism, the combination of a control lever, springs connected with said lever and normally inactive, an arm coöperating with said springs whereby to render the springs alternately operative to effect movement of the control lever, and means to properly time the movement of the control lever after the rendering operative of said springs.

33. In transfer control mechanism, the combination of a control lever, springs connected with said lever and normally inactive, an arm coöperating with said springs whereby to render the springs alternately operative to effect movement of the control lever, and means to properly time the movement of the control lever after the rendering operative of said springs including a movement delaying connection intermediate the lever and the arm.

34. In transfer control mechanism, the combination of a control lever, springs connected with said lever and normally inactive, an arm coöperating with said springs whereby to render the springs alternately operative to effect movement of the control lever, means to properly time the movement of the control lever after the rendering operative of said springs including a movement delaying connection intermediate the lever and the arm, and a separate interlocking connection between the lever and the arm coöperating with said springs in controlling the movement of the lever.

35. In transfer control mechanism, a carrying member, a control lever connected therewith, separate energy storing devices connected with said lever and normally inactive, and means to render said energy storing devices successively operative to impart different movements to said control lever.

36. In transfer control mechanism, a carrying member, a control lever connected therewith, separate energy storing devices connected with said lever and normally inactive, means to render said energy storing devices successively operative to impart different movements to said control lever, and coöperative means between the control lever and the means for rendering the energy storing devices operative to delay the movement of the lever a predetermined time after each energy storing device becomes operative.

In testimony whereof I affix my signature in presence of two witnesses.

GUSTAF RUNQUIST.

Witnesses:
 EDW. C. BAKER,
 MABEL BEAVER.

Corrections in Letters Patent No. 1,213,268.

It is hereby certified that in Letters Patent No. 1,213,268, granted January 23, 1917, upon the application of Gustaf Runquist, of Terre Haute, Indiana, for an improvement in "Adding and Listing Machines," errors appear in the printed specification requiring correction as follows: Page 7, lines 59-60, claim 13, strike out the words "up therein whereby to effect movement of the lever, and different movements" and insert the words *up therein whereby to effect different movements of the lever, and a movement;* page 8, claim 23, line 84, after "actuator" insert a comma; lines 84-85, strike out the words and comma "and the carrier,"; line 86, after "actuator" insert the words *and the carrier;* and that the said Letters Patent should be read with these corrections therein that the same may conform to the record of the case in the Patent Office.

Signed and sealed this 6th day of March, A. D., 1917.

[SEAL.]

F. W. H. CLAY,
*Acting Commissioner of Patents.*

Cl. 235—60.